United States Patent
Sharma et al.

[19]

[11] Patent Number: 5,960,463
[45] Date of Patent: Sep. 28, 1999

[54] CACHE CONTROLLER WITH TABLE WALK LOGIC TIGHTLY COUPLED TO SECOND LEVEL ACCESS LOGIC

[75] Inventors: Puneet Sharma, San Jose; John Gregory Favor, Scotts Valley, both of Calif.

[73] Assignee: Advanced Micro Devices, Inc., Sunnyvale, Calif.

[21] Appl. No.: 08/649,847

[22] Filed: May 16, 1996

[51] Int. Cl.$^6$ ............................. G06F 12/10; G06F 12/08
[52] U.S. Cl. ............................................ 711/206; 711/203
[58] Field of Search ................................... 711/207, 203, 711/205, 206

[56] References Cited

U.S. PATENT DOCUMENTS

| | | | |
|---|---|---|---|
| 4,241,401 | 12/1980 | De Ward et al. | 711/207 |
| 4,890,223 | 12/1989 | Cruess et al. | 711/207 |
| 4,985,829 | 1/1991 | Thatte et al. | 711/207 |
| 5,222,223 | 6/1993 | Webb, Jr. et al. | 711/140 |
| 5,255,384 | 10/1993 | Sachs et al. | 711/207 |
| 5,265,227 | 11/1993 | Kohn et al. | 711/207 |
| 5,307,477 | 4/1994 | Taylor et al. | 711/3 |
| 5,349,651 | 9/1994 | Hetherington et al. | 711/207 |
| 5,412,787 | 5/1995 | Forsyth et al. | 711/207 |

OTHER PUBLICATIONS

Levitan, D. et al., "The PowerPC 620™ Microprocessor: A High Performance Superscalar RISC Microprocessor" *IEEE* (1995).

*Primary Examiner*—Eddie P. Chan
*Assistant Examiner*—Yamir Encarnación
*Attorney, Agent, or Firm*—Omkar K. Suryadevara; Skjerven, Morrill, MacPherson, Franklin & Friel LLP

[57] ABSTRACT

Table walk logic and a second level access logic are tightly coupled to each other in a second level control unit that can operate in one of two modes, a translate mode that uses the table walk logic and an access mode that uses the second level access logic. In the translate mode, the second level control unit uses the table walk logic for automatic translation of a virtual address to a corresponding physical address. In the access mode, the second level control unit allows a word to be loaded from or stored into a given physical address. The second level control unit prioritizes operations in the two modes e.g. performs an operation in the access mode prior to performance of an operation in the translate mode. The table walk logic and the second level access logic can be integrated together into a single state machine, so that operations in the two modes are mutually exclusive and indivisible with respect to each other. Tight coupling of the two logics fundamentally enhances address translation circuitry, e.g. saves space and increases speed, as compared to prior art devices. Such tight coupling also eliminates an access into the first level cache for address translation, eliminates pollution of the first level cache by table entries and also reduces contention for the first level cache.

26 Claims, 12 Drawing Sheets

CACHE CONTROLLER WITH TABLE WALK LOGIC TIGHTLY COUPLED TO SECOND LEVEL ACCESS LOGIC

CROSS REFERENCE TO RELATED APPLICATIONS

This application is related to and incorporates by reference in its entirety, the copending, concurrently filed and commonly owned U.S. patent application Ser. No. 08/649,243, entitled "UNIFIED MULTI-FUNCTION OPERATION SCHEDULER FOR OUT-OF-ORDER EXECUTION IN A SUPERSCALAR PROCESSOR" by John G. Favor et al. that is a continuation of U.S. patent application Ser. No. 08/590,383 filed Jan. 26, 1996.

This application is also related to and incorporates by reference in its entirety, the copending, concurrently filed and commonly owned U.S. Pat. No. 5,761,736, entitled "APPARATUS AND METHOD FOR IMPLEMENTING MULTIPLE SCALED STATES IN A STATE MACHINE" by Puneet Sharma and John G. Favor.

FIELD OF THE INVENTION

This invention relates to memory management in computer systems, and in particular to a method and circuitry for efficient retrieval of page directory entries and page table entries needed for translation of a virtual address to a physical address used to access words from memory.

BACKGROUND OF THE INVENTION

Computer systems having a central processing unit (CPU) and memory for storing instructions and data are well known. A typical computer system can have many types of memory that together form a hierarchy, wherein a memory's capacity increases, and speed and cost decrease as one moves down the hierarchy. A cache is a relatively fast, small memory that is used to provide local storage for frequently accessed locations of a larger, relatively slow, main memory. Main memory in turn is relatively faster, smaller and more expensive than magnetic disks or magnetic tape.

Computer programs that run in such a computer system typically use a virtual address to reference operands in memory. The virtual address is translated by the computer system into a physical address that is actually used to retrieve a word from main memory. The address translation from a virtual address to a corresponding physical address involves retrieval of one or more entries, called "table entries", from one or more tables, called "address translation tables." Typically, each table entry includes a high address portion, called a "tag" of the virtual address, a similar tag of the corresponding physical address, and certain status bits, such as an access bit and a dirty bit.

An access to main memory for every address translation limits the CPU's speed in executing any given instruction, as compared to directly using a physical address. To avoid access to main memory for each address translation operation, a limited number of frequently used virtual addresses and their corresponding physical addresses can be stored locally in a memory, commonly referred to as a "translation lookaside buffer" (TLB), and located on the same integrated chip as the CPU.

When a table entry containing a certain virtual address tag is not found in the TLB, i.e. when a TLB "read miss" occurs, a table look up can be performed in a cache on the chip followed by a lookup in main memory. The retrieved table entry is then stored in the TLB, i.e. a TLB "line fill" occurs.

A TLB read miss can occur under a variety of conditions, depending on the computer program being executed, and on the algorithm, such as a least recently used (LRU) algorithm, used to overwrite an old entry during a TLB line fill.

When a table look up is performed on a read miss, the CPU may have to wait for not only a slow access to main memory, but even a slower access to magnetic disk, e.g. if only a portion of the address translation table is located in main memory and does not contain the necessary table entry, typically if the CPU switches to execution of a new process. Moreover, the CPU may have to wait even after completion of a table look up, for example to retrieve a word from the addressed location in main memory, and occasionally for retrieval of the word at the addressed location from magnetic disk.

SUMMARY OF THE INVENTION

A computer system in accordance with the invention has a microprocessor chip with a first level cache on the microprocessor chip, main memory, and an optional second level cache interposed between the first level cache and the main memory. To access a word from memory, the computer system translates a virtual address of the word into a physical address, and uses the translated physical address. In addition to the first level cache, the microprocessor chip includes a translation lookaside buffer (TLB) that stores entries of one or more tables used to map a virtual address to a corresponding physical address.

When a portion of a virtual address, called a "tag" is not found in a TLB, the TLB does not access the first level cache, and rather, the TLB passes the tag to a portion of the computer system called "table walk logic". That is, the first level cache is decoupled from the TLB and is not used during address translation in accordance with this invention. Rather, an address translation operation is performed automatically by the table walk logic in response to a translate request signal. The address translation operation is performed without any additional input from other portions of the microprocessor chip, such as a TLB and a first level cache. The address translation operation is an indivisible operation in one embodiment, as described below.

Therefore, time is saved by avoiding access to a first level cache during address translation, because of the low probability of a hit for a table entry in the first level cache. Elimination of such an access into the first level cache for address translation also reduces contention for the first level cache from other portions of the microprocessor chip, i.e. makes the first level cache more available for a load operation or a store operation, and hence faster. Elimination of such an access to a first level cache also eliminates pollution of the first level cache, e.g. storage of table entries that are typically overwritten before being accessed or reaccessed. Elimination of such pollution in turn allows more useful words to be stored in the first level cache, and so reduces the likelihood of a read miss in the first cache, i.e. improves the first level cache's hit rate. Elimination of such a first level cache access also reduces the need to make the first level cache multi-ported i.e. reduces the need for multiple accesses per cycle.

In one embodiment, a second level access logic that is used to access words from the optional second level cache and from the main memory is coupled to the table walk logic, and both logics are included in a second level control unit of the computer system. The second level control unit is responsive to two types of request signals (also referred to as "control request signals"): a translate request signal and an access request signal.

In response to a translate request signal, the second level control unit invokes the table walk logic to retrieve one or more table entries as necessary. Specifically, in this embodiment, the second level control unit has control request terminals and address input terminals. The second level control unit receives from a TLB, a translate request signal on a control request terminal and a portion, also called "tag", of the virtual address at the address input terminals. In response to the translate request signal, the second level control unit invokes the table walk logic that automatically performs a number of steps needed to retrieve one or more table entries for the received tag.

In one particular embodiment, the table walk logic combines a first group of bits from the received tag with a table base address from a register to form a first table entry's address and automatically retrieves the first table entry. The table walk logic also automatically retrieves a second table entry, after combining a portion of the retrieved first table entry with a second group of bits from the received tag to form the second table entry's address. Moreover, the table walk logic also automatically does housekeeping functions, e.g., checking access violations and setting a dirty or access bit.

The table walk logic of this invention retrieves table entries and performs housekeeping functions automatically, for example, without waiting for signals from the TLB at various steps in the address translation operation. Hence, the table walk logic of this invention is faster than conventional table walk devices. Moreover, an address translation operation of the table walk logic can be made an indivisible operation, i.e. uninterrupted by one or more request signals (also called "internal request signals") from other portions of the microprocessor e.g. from a first level cache or from another TLB. All such internal request signals are kept pending until completion of the indivisible operation, unless the request signal (also called "external request signal") is from the system bus, such as a snoop request signal. A snoop request signal is serviced at the highest priority by interrupting the indivisible operation when allowed, as described below. Such interruption of the indivisible operation by an external request signal avoids a deadlock situation that would otherwise arise from the microprocessor chip and the system bus waiting for each other.

In another embodiment, the table walk logic receives a complete virtual address instead of just a tag as described above. In this other embodiment, the table walk logic retrieves a first table entry, automatically retrieves a second table entry if necessary as described above and further automatically forms a physical address by combining the low order portion of the virtual address with at least a portion of the second table entry, and returns the physical address to the TLB. In other embodiments, the table walk logic can also automatically drive an access request signal for access of a word from the calculated physical address.

In response to an access request signal at the control request terminals, the second level control unit invokes a second level access logic to load or store a word at a physical address specified at the address input terminals. The second level control unit can prioritize operations of the two logics, e.g. invoke the table walk logic after invoking the second level access logic (or vice versa), if an access request signal and a translate request signal are both received simultaneously or are pending concurrently. The second level access logic also performs housekeeping functions, such as servicing a snoop request signal and flushing a table entry from the second level cache line to main memory.

In one embodiment, the two logics of the second level control unit are both formed on a single microprocessor chip that includes two first level caches: an instruction cache and a data cache. The instruction cache includes an instruction word cache that holds instructions and an instruction TLB that holds table entries for translation of instruction addresses. The data cache includes a data word cache that holds data operands and a data TLB that holds table entries for translation of data addresses. The two word caches and the two TLBs, i.e. four storage components of the integrated circuit chip share a single second level control unit, thereby saving space on the microprocessor chip. Moreover the table walk logic and the second level access logic can access a second level cache prior to accessing main memory, if the second level cache controller is coupled to an optional second level cache. In this particular embodiment, the two logics use the same units, e.g. a system interface unit used to access main memory, and a second level cache interface unit used to access the optional second level cache. Such sharing of commonly used units also saves space on the chip.

Also, in one embodiment, table walk logic and the second level access logic are implemented by a single state machine, called "access translate state machine". The second level control unit that includes the two logics operates in at least two modes, namely a translate mode that uses the table walk logic, and an access mode that uses the second level access logic. Operations in the two modes are made mutually exclusive and indivisible with respect to each other by use of the single state machine. The single state machine tightly couples these two logics and eliminates the need to pass information back and forth between the table walk logic and the second level control logic, e.g. to arbitrate the sharing of commonly used units. The single state machine saves time and space by eliminating the need for such arbitration.

One particular embodiment of the second level control unit also includes an address supply circuit that selects for operation, one of a number of addresses received by the second level control unit, using a priority scheme. According to the priority scheme, the address supply circuit selects a physical address and operates in the access mode, if both an access request signal and a translate request signal are pending on completion of an operation. Also in this particular embodiment, from among a number of received physical addresses, the address supply circuit prioritizes in the following order, with the highest priority address being listed first: a write address from the data word cache, a read address from the data word cache, a read address from the instruction word cache. Also, from among a number of received virtual addresses, the address supply circuit first translates a virtual address portion from the data TLB, and then translates a virtual address portion from the instruction TLB.

The second level control unit of this embodiment is coupled to a second level cache interface unit, and both units are included in a second level cache controller of the computer system. If a second level cache is present, the second level cache interface unit passes an address received from the address supply circuit to the second level cache. Then the second level cache interface unit drives a status signal indicative of the results received from the second level cache, e.g. a read miss, or an access violation, in addition to any words that may be received, e.g., on a read access.

In response to a read miss status signal from the second level cache interface unit, the access translate state machine drives a bus request signal to the system interface unit. On receipt of a word from the system interface unit, the second level cache interface unit performs a line fill in the second level cache if the received data is cacheable. The second level cache interface unit also supplies a received word to the particular component that requested the word, while the access translate state machine drives an acknowledge requestor signal, to indicate completion of service of the request signal. The second level cache controller then processes another request signal that may be pending or waits for a new request signal.

BRIEF DESCRIPTION OF THE DRAWINGS

Use of the same reference numerals in different figures indicates similar or identical items.

DETAILED DESCRIPTION

Figure 1A:
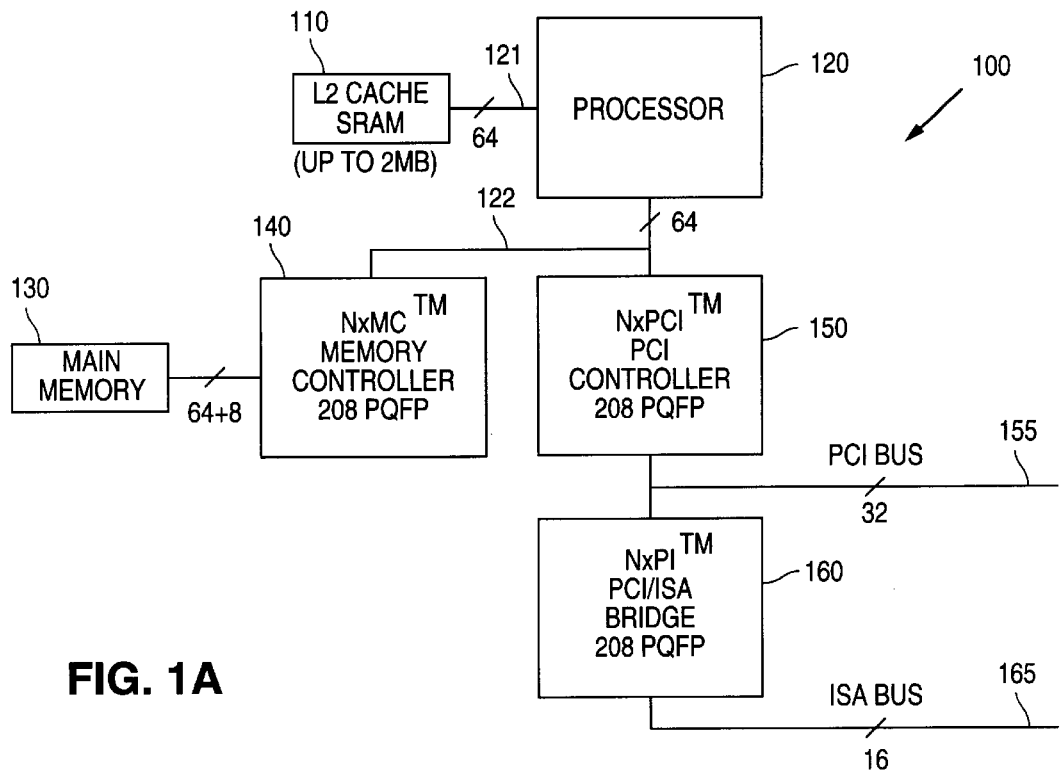
FIGS. 1A and 1B show block diagrams of a computer system including a processor in accordance with two embodiments of the invention.

According to the invention, a processor has a first level cache to hold frequently used words and a table walk logic for translation of a virtual address to a physical address. The table walk logic is decoupled from the first level cache, and in one embodiment, is tightly coupled to a second level access logic that is normally used to access words not found in the first level cache. In one specific embodiment the tight coupling is implemented by a single state machine. Moreover, the table walk logic of this invention performs a number of steps needed for address translation automatically, as described below.

In one particular embodiment, the virtual address referred to in the address translation described below is a linear address as described in "Programming the 80386" by John H. Crawford and Patrick P. Gelsinger, published in 1987 by SYBEX Inc., 2021 Challenger Drive, #100, Alameda, Calif. 94051, that is incorporated by reference herein in its entirety.

In a computer system 100 (FIG. 1A), a processor 120 in one embodiment of the invention is a monolithic integrated circuit capable of executing a complex instruction set, and may be manufactured using conventional integrated circuit processes, such as a five layer metal CMOS process having 0.35 $\mu$m design rules. In this embodiment, processor 120 is connected to an external second level cache 110, to a memory controller 140 that is connected to main memory 130, and to bus controllers 150 and 160 that are connected to buses, such as a PCI bus 155 and an ISA bus 165.

Figure 2A:
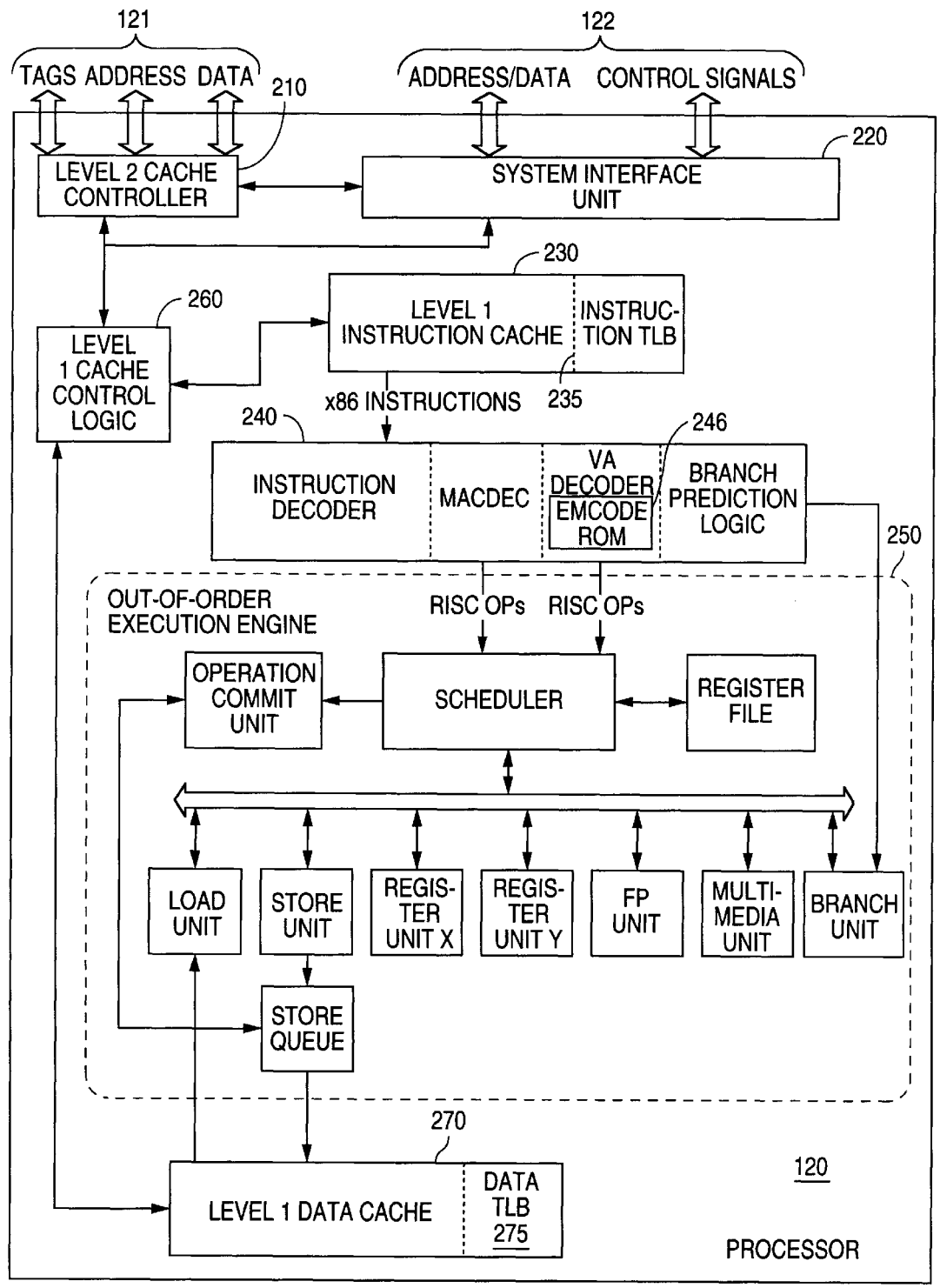
FIGS. 2A and 2B shows a processor in accordance with two embodiment of the invention.

Processor 120 (FIG. 2A) has a system interface unit 220 that provides access to devices in the address space of computer system 100, including access to main memory 130 and peripheral devices on busses 155 and 165. A level-2 cache controller 210 in processor 120 is coupled through a level-2 bus 121 to an external SRAM which forms the level-2 cache 110 (FIG. 1A).

In the enclosed description, the terms "second level", "level-2" and "L2" are used interchangeably, e.g. a "second level" cache is identical to a "level-2 cache" or a "L2 cache." Similarly, the terms "first level", "level-1" and "L1" are used interchangeably.

Processor 120 of one embodiment (FIG. 1A) includes a first level cache formed by an instruction cache 230, (FIG. 3A) and a data cache 270 that are both coupled through a level-1 control logic 260 to level-2 cache controller 210 and to system interface unit 220.

In one embodiment, instruction cache 230 has storage locations that form an instruction word cache 231 for caching instructions that are executed by processor 120, and also has storage locations that form an instruction translation lookaside buffer 235, hereinafter "instruction TLB" 235. Instruction TLB 235 holds table entries used in translation of virtual addresses of the instructions. Similarly, data cache 270 has storage locations that form a data word cache 271 for caching data operands used by processor 120, and also has storage locations that form a data TLB 275 for holding table entries used in translation of virtual addresses of the data operands.

In an exemplary embodiment, instruction cache 230 includes a 16 KB two-way set-associative cache as instruction word cache 231 and a 64 entry cache (approximately 1 KB) as instruction TLB 236. In this exemplary embodiment, data cache 270 includes a 32 KB two-way set-associative cache as data word cache 271 and a 128 entry cache (approximately 2 KB) as data TLB 275. In an alternative embodiment, instruction cache 230 and data cache 270 are direct mapped caches, wherein each cache line contains one of a number of words of main memory 130. All words storable in a cache line in either of these two embodiments have the same low order address bits (e.g. bits 13:3), with the number of bits (e.g. eleven bits) depending on the size of the cache. Moreover, in the exemplary embodiment, second level cache 110 is a direct mapped cache.

In one specific embodiment, the two word caches, 231 and 271, and the two TLBs 235 and 275 together form four storage components of computer system 100. Any one of the four storage components 231, 271, 235, 275 can drive a control request signal to level-2 cache controller 210, e.g. if a word is not found in a cache, or if an entry is not found in a TLB. Processor 120 includes a number of other components, such as execution engine 250 and instruction decoder 240, that are not significant aspects of the invention.

Level-2 cache controller 210 (FIG. 3A) has a number of TLB terminals 211 that are coupled to data TLB 275 and instruction TLB 235, a number of level-1 terminals 212 that are coupled to level-1 control logic 260, a number of system terminals 214 that are coupled to system interface unit 220. Level-2 cache controller 210 also has, in this embodiment, a number of cache terminals 215 that are coupled to level-2 bus 121. Level-2 bus 121 includes a number of address lines, data lines, tag lines and at least two control lines, namely an output enable line and a write enable line for a static random access memory (SRAM). If L2 bus 121 is coupled to a number of chips, then L2 bus 121 can also include additional control lines for chip select signals generated from address signals otherwise normally passed to the address lines in L2 bus 121.

Level-2 cache controller 210 includes a memory access logic 310 (FIG. 3A) for performing an access operation, e.g. read or write a word to level-2 cache 110 (FIG. 1A) and to main memory 130. Specifically, in response to an access request signal on a level-1 terminal 212 (FIG. 3A), e.g. write request signal MEMORYWRREQUEST or read request signal MEMORYRDREQUEST from data word cache 271, or read request signal MEMORYRDREQUEST from instruction word cache 231, level-2 cache controller 210 uses memory access logic 310 to perform the necessary access to level-2 cache 110 if present. Level-2 cache controller 210 also performs an access to main memory 130 either if level-2 cache 110 is not present or if the necessary word is not found in level-2 cache 110.

Figure 3A:
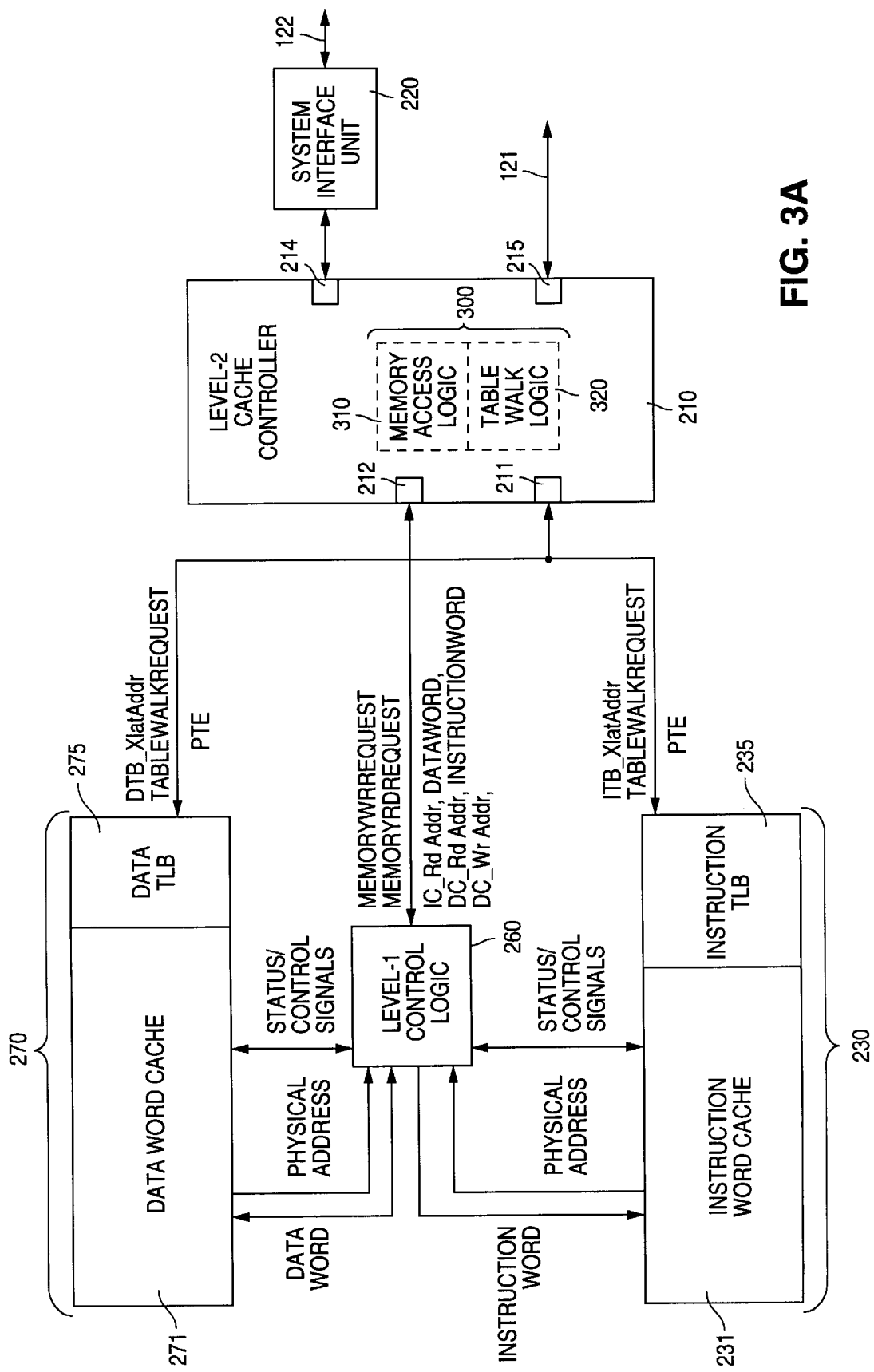
FIGS. 3A and 3B each illustrate in a high level block diagram, the connections between a second level cache controller, a system interface unit and four storage components of the computer system illustrated in respective FIGS. 2A and 2B.

Moreover, level-2 cache controller also includes a table walk logic 320 (FIG. 3A). In response to an active request signal e.g. translate request signal TABLEWALKREQUEST from data TLB 275 (or from instruction TLB 235), level-2 cache controller uses table walk logic 320 to combine the respective portion of the virtual address signal e.g. signal DTB_XlatAddr (or signal ITB_XlatAddr) with a value from a register e.g. register CR3 (FIG. 7) and perform a table look-up, as described below.

Instruction TLB 235 and data TLB 275 send the translate request signal TABLEWALKREQUEST without accessing the first level cache, e.g. instruction word cache 231 and data word cache 271. Therefore, in this embodiment table walk logic 320 is decoupled from first level cache 230, 270. Elimination of an access to first level cache 230, 270 for address translation reduces contention for word caches 231 and 271, e.g. from table walk logic 320 in addition to instruction decoder 240, and load and store units of execution engine 250, described above in reference to FIG. 2A.

Elimination of the access to word caches 231 and 271 for address translation also eliminates pollution of word caches 231 and 271. That is, lines in word caches 231, 271 that would otherwise have been used for storage of table entries, e.g., page directory entry CPDE (FIG. 7) and page table entry CPTE, are now available for storage of instruction words or data words, and therefore improve the hit rate of word caches 231 and 271.

Level-2 cache controller 210 also performs housekeeping tasks, such as checking privilege of user versus supervisor, or setting a dirty bit D or access bit A for a table entry. Level-2 cache controller 210 sets a dirty bit D in a page table entry e.g. entry MPTE only for signal TABLEWALKREQUEST from the data TLB (there is no D bit for the entry for instruction TLB in one embodiment of the invention).

Figure 1B:
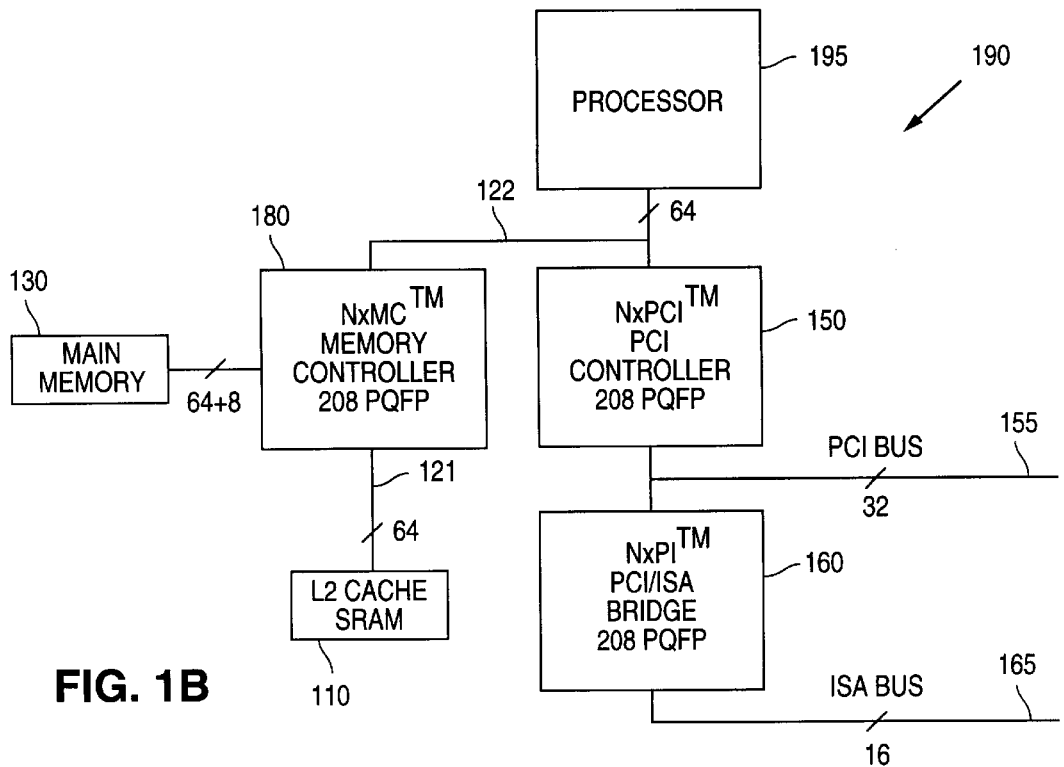
Figure 2B:
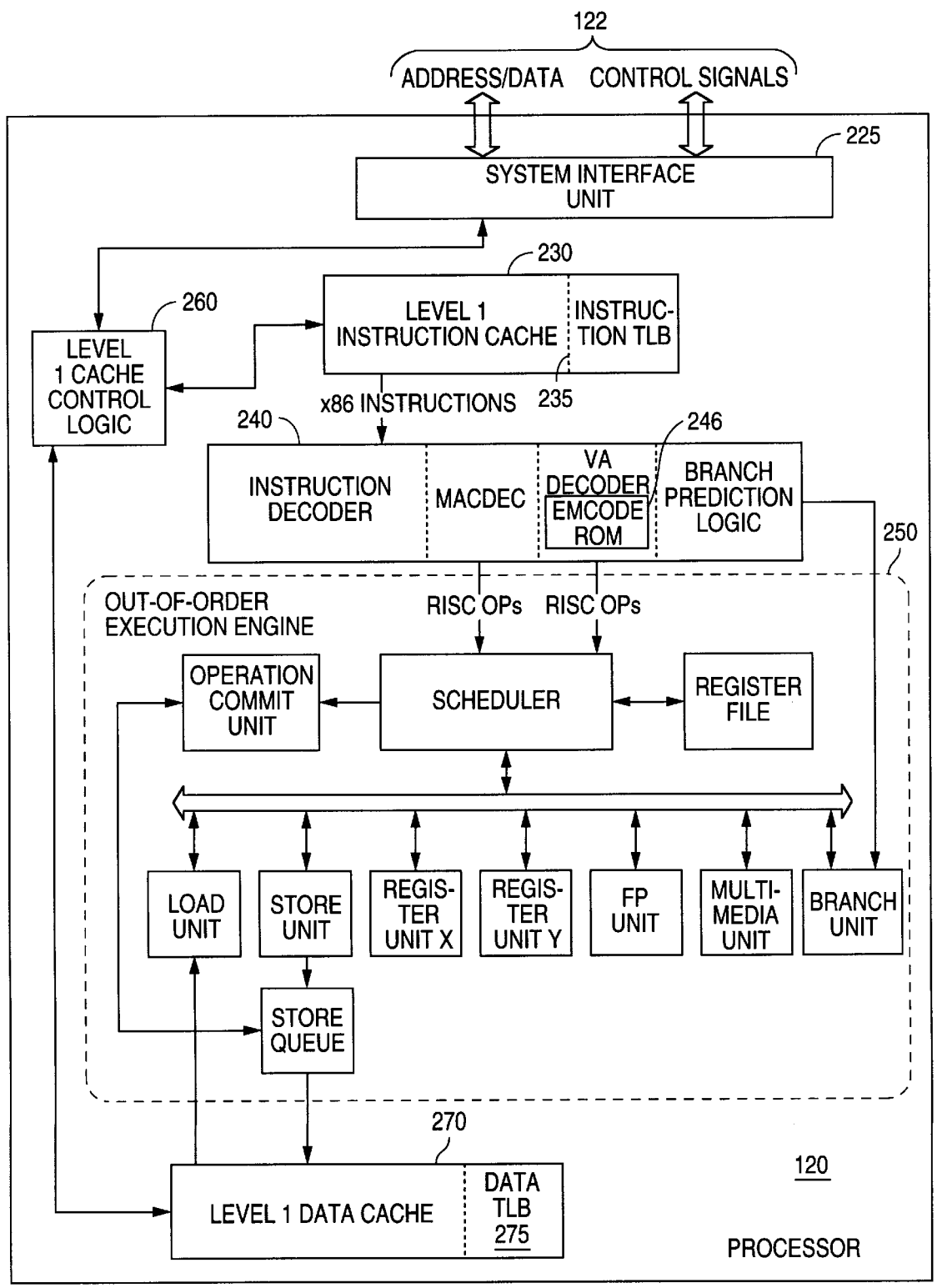

Although in one embodiment, processor 120 includes level-2 cache controller for directly accessing level-2 cache 110, in an alternative embodiment a processor 195 (FIG. 1B) is devoid of level-2 cache controller 210 and accesses level-2 cache 110 through system interface unit 225 (FIG. 2B) and memory controller 180 (FIG. 1B).

Figure 3B:
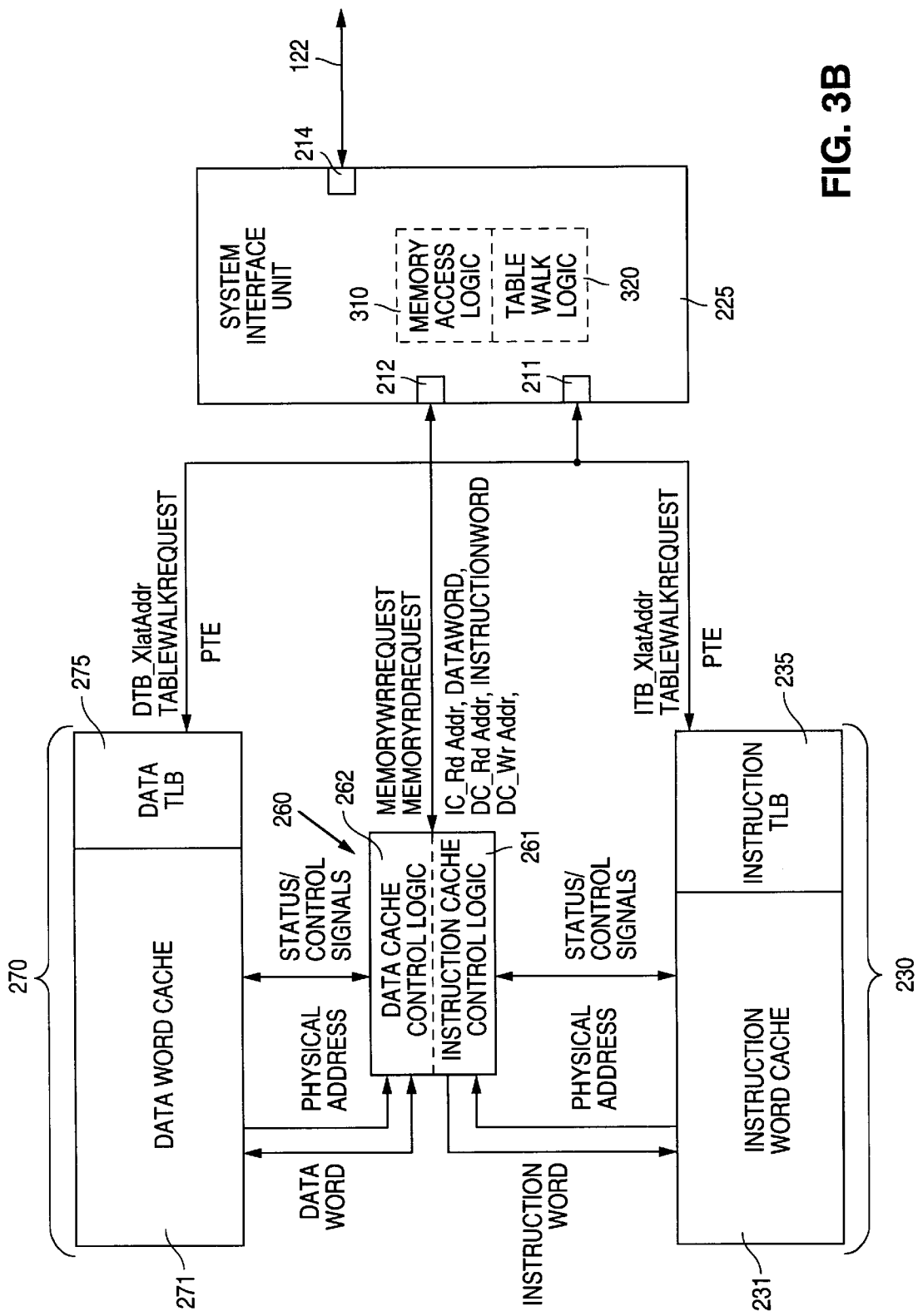

In this alternative embodiment, memory controller 180 includes a level-2 cache interface unit 410 (FIG. 4A) that is coupled to level-2 bus 121. Moreover, system interface unit 225 (FIG. 3B) includes memory access logic 310 and table walk logic 320 that together include access translate state machine 340 (FIG. 4B) that is described more completely below. The embodiment illustrated in FIGS. 1B, 2B, 3B and 4B and other such alternative embodiments are within ordinary skill in the art in view of the enclosed disclosure.

Moreover, although in FIG. 3A, level-1 control logic 260 is illustrated as a single unit, in the alternative embodiment (FIG. 3B), two different level-1 control logics, namely a data cache control logic 262 and an instruction cache control logic 261 are used. Data cache control logic 262 and instruction cache control logic 261 operate independent of each other. Level-2 cache controller 210 maintains cache coherency and mutual exclusion between data cache 270 and instruction cache 230.

In one particular embodiment, memory access logic 310 (FIG. 3A) and table walk logic 320 are included in a level-2 control unit 300 that can operate in one of at least two modes, an access mode and a translate mode. Level-2 control unit 300 uses memory access logic 310 in the access mode and uses the table walk logic 311 in the translate mode. Level-2 control unit 300 operates in the access mode prior to performing an operation in the translate mode, if control request signals are received at both TLB terminals 211 and level-1 terminals 212 either simultaneously, or are pending on completion of an operation in one of the two modes.

TLB terminals 211 and level-1 terminals 212 are coupled to a number of control request terminals 331 (FIG. 4A) and address input terminals 332 of level-2 control unit 300. Level-2 control unit 300 also has a number of physical address terminals 334 that are used to address a location in memory e.g. level-2 cache 110 and main memory 130 (FIG. 1A), and a number of table entry terminals 333 that are used to receive a word from an addressed memory location. Moreover, level-2 control unit 300 has one or more system control terminals 335 that are coupled to system interface unit 220. Level-2 control unit 300 of this embodiment also has one or more cache control terminals 336 and one or more cache status terminals 337 that are coupled to a level-2 cache interface unit 320 also included in level-2 cache controller 210.

Physical address terminals 334 are coupled to physical address lines 411 (FIG. 4A) of a level-2 cache interface unit 410 that is also included in level-2 cache controller 210. Level-2 cache interface unit 410 passes a physical address signal received on physical address lines 411 to cache bus terminals 416 that are coupled to L2 bus 121, in response to an active signal on a cache control line 412 that is coupled to cache control terminal 336.

Level-2 cache interface unit 410 performs operations without regard to the origin of an address signal, i.e. irrespective of whether an address signal on physical address lines 411 was created by address supply circuit 350, or was received from data word cache 271 or instruction word cache 231. In case of a write access operation, level-2 cache interface unit 410 passes a data word signal DATAWORD received on write data lines 413 to cache bus terminals 416.

Moreover, in case of a read access operation, level-2 cache interface unit 410 supplies a data word signal DATA-WORD received on cache bus terminals 416 onto cache output lines 415 that are coupled to table entry terminals 333, e.g. so that address supply circuit 350 can receive a page directory entry needed to compute the address of a page table entry.

Level-2 cache interface unit 410 also checks for privilege violations while accessing a memory location indicated by the address signal on physical address lines 411, and passes a status signal e.g. signal ACCESSVIOLATION (FIG. 5) on a cache output line 415 (FIG. 4A) that is coupled to a cache status terminal 337 of level-2 control unit 300.

Level-2 cache interface unit 410 also has a number of system interface terminals 414 that are coupled to system interface unit 220. If an addressed word cannot be found in second level cache 110 (FIG. 1A) coupled to level-2 bus 121, level-2 cache interface unit 410 (FIG. 4A) passes the address signal from physical address lines 411 onto the system interface terminals 414 to access the addressed location from main memory 130.

Figure 4A:
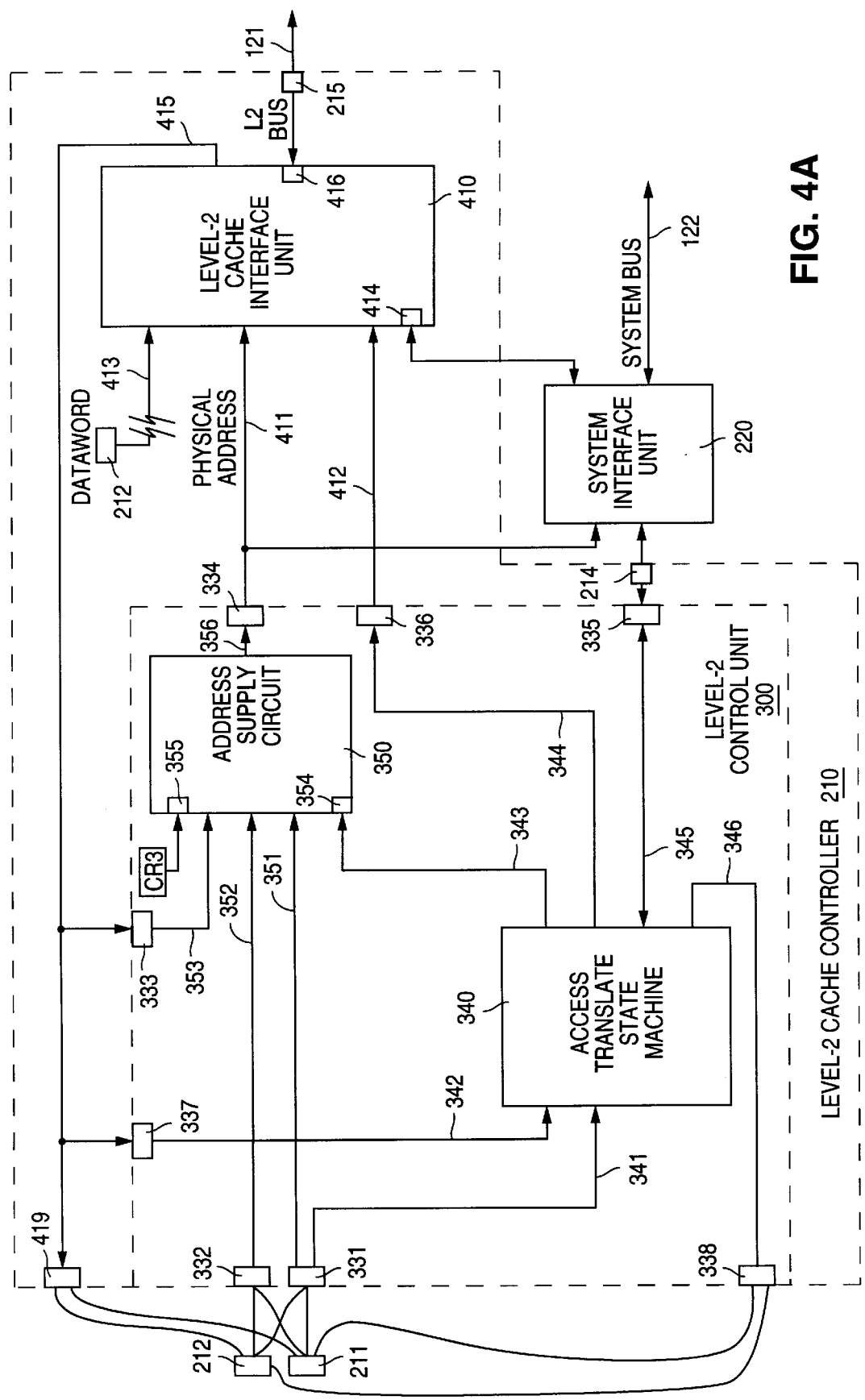
FIGS. 4A and 4B each illustrate in an intermediate level block diagram, the second level cache controller of FIG. 3A and the system interface unit of FIG. 3B respectively.
Figure 4B:
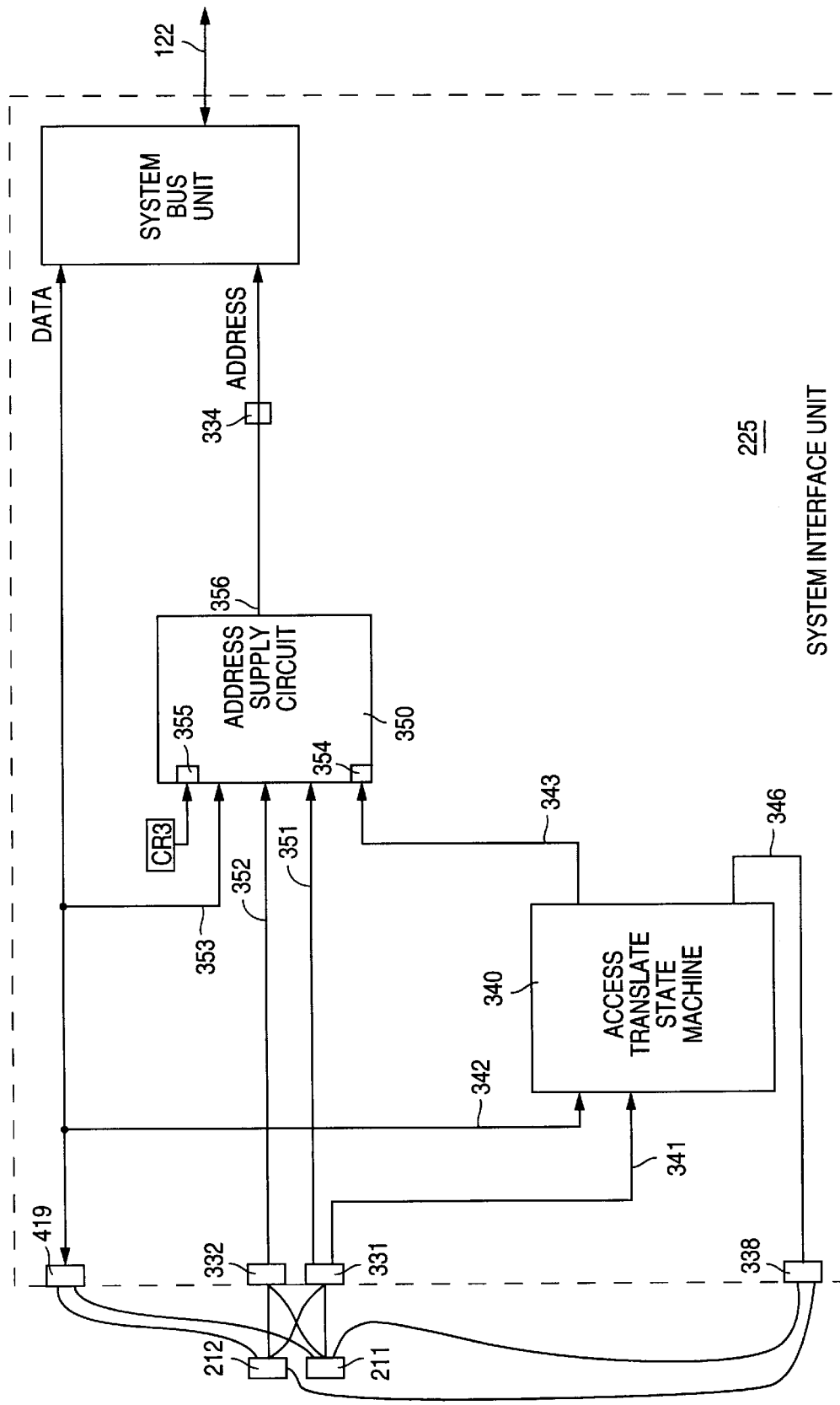

In one specific embodiment, memory access logic 310 (FIG. 3A) and table walk logic 320 are tightly coupled to each other by a single state machine, also called "access translate" state machine 340 (FIG. 4A). At any given time, access translate state machine 340 only processes one of several request signals that may be active on control request lines 341 that are coupled to the respective control request terminals 331. The unprocessed request signals are kept pending and processed sequentially.

Access translate state machine 340 of this embodiment also has a cache status line 342 coupled to a cache status terminal 337, a cache control line 344 coupled to a cache control terminal 336, and a system control line 345 coupled to a system control terminal 335. Access translate state machine 340 also has a latch request line 343 that is coupled to a latch request terminal 354 of an address supply circuit 350 that is also included in level-2 control unit 300. Moreover, access translate state machine 340 also has a status line 346 that is coupled to status terminal 338. Status terminal 338 is in turn coupled to level-1 terminals 212 and TLB terminals 211, thereby to indicate status to any portion, e.g. one of storage components 231, 235, 271, 275.

In response to an active latch request signal on latch request terminal 354, address supply circuit 350 supplies a physical address on physical address lines 356 coupled to physical address terminals 334, based on address signals on address input lines 352 coupled to address input terminals 332.

Specifically, address supply circuit 350 selects an address according to the following priority scheme with the highest priority address being listed first: write address from data cache 270, read address from data cache 270, read address from instruction cache 230, translate address from data TLB 275 or translate address from instruction TLB 235. In one particular embodiment, the priority scheme is subordinate to an external snoop signal, from system bus 122 that is processed at the highest priority by level-2 control unit 300. Specifically, access translate state machine 340 transitions into a memory housekeeping state on receipt of an external snoop signal in certain states that are described below.

If a translate address is selected for processing, address supply circuit 350 forms a page directory entry address by combining the translate address with a table base address signal on table base address terminals 355 that are coupled to a table base address register, e.g. register CR3. Address supply circuit 350 then supplies the page directory entry address on physical address lines 356, and on receipt of a page directory entry signal on table entry lines 353 that are coupled to table entry terminals 333, address supply circuit 350 automatically forms a page table entry address using the translate address, and supplies the page table entry address at physical address lines 356.

Figure 5:
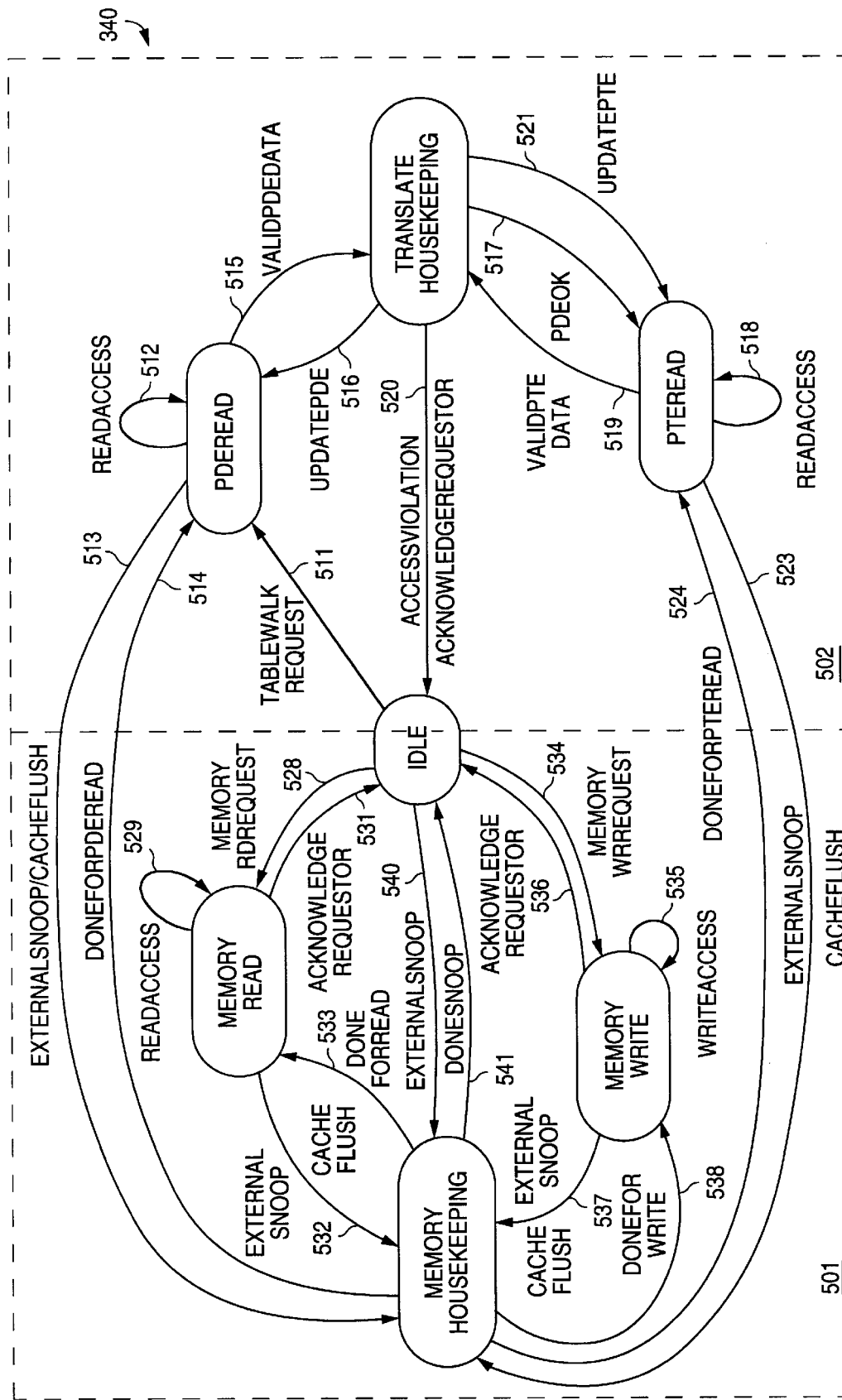
FIG. 5 illustrates states and related transitions of the access translate state machine of FIGS. 4A and 4B that implements the table walk logic and the memory access logic of FIGS. 3A and 3B.
Figure 7:
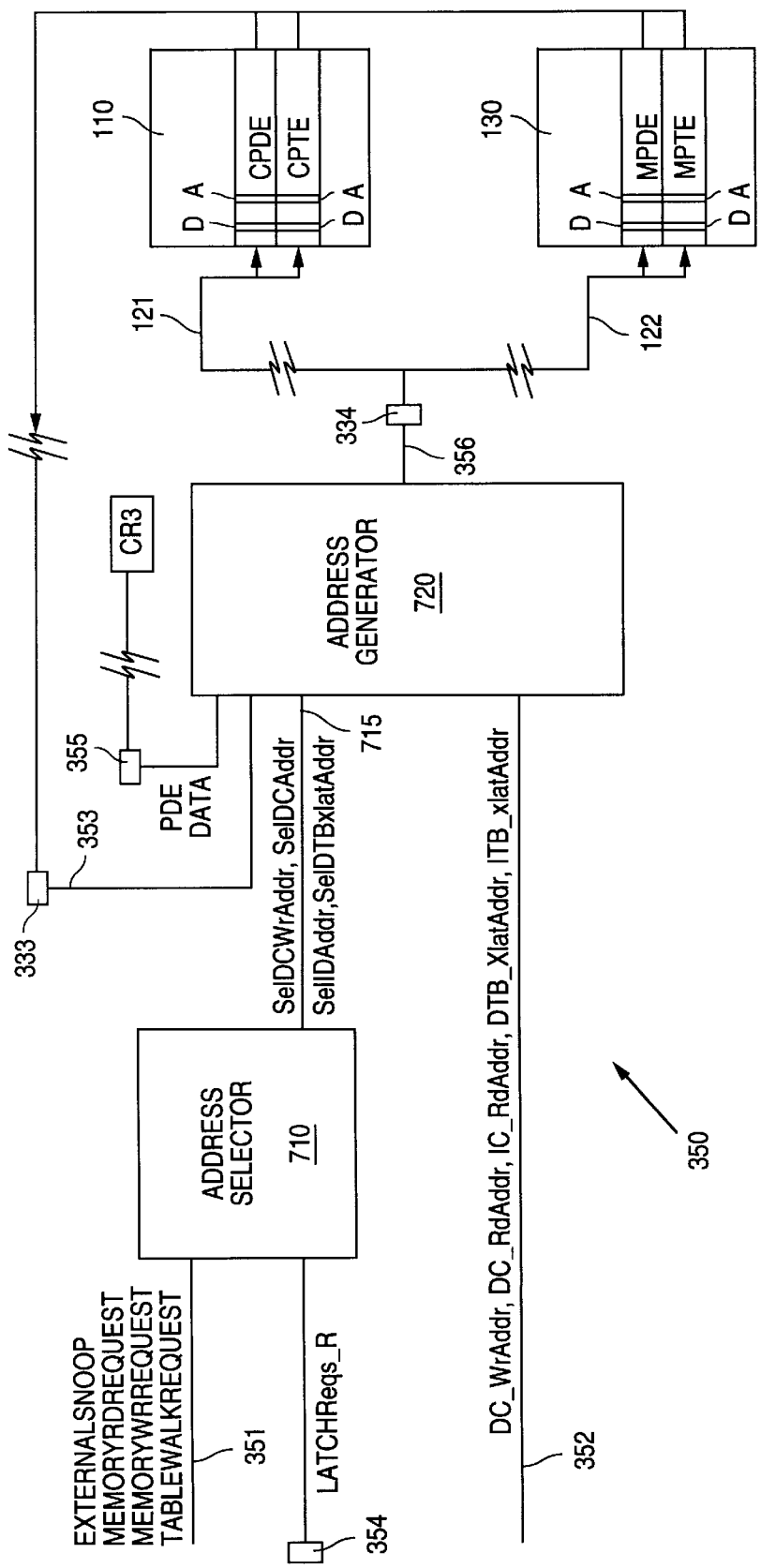
FIG. 7 illustrates an address supply circuit of FIGS. 4A and 4B.

One embodiment of access translate state machine 340 is illustrated in FIG. 5. Access translate state machine 340 (FIG. 5), hereinafter simply "state machine 340" waits in a state IDLE for request signals such as an access request signal or a translate request signal on control request terminals 331 (FIG. 4A). If the only pending control request signal is a translate request signal TABLEWALKREQUEST (FIG. 5), for example, from instruction TLB 235 (FIG. 3A), state machine 340 transitions from state IDLE (FIG. 5) to state PDEREAD via branch 511. While transitioning from state IDLE, state machine 340 drives a latch request signal LatchReqs_r (FIG. 7), to cause address selector 710 to freeze the signal on line 715 that in turn causes address generator 720 to freeze the signals on bus 356 (FIG. 7).

Once state machine 340 starts processing a request signal, state machine 340 is insensitive to most other request signals such as internal request signals from various portions of processor 120, e.g. instruction cache 230, data cache 270, instruction TLB 235 and data TLB 275, until after completion of service of the current request signal. That is, state machine 340 continues to process the signal TABLEWALKREQUEST automatically by performing a number of address translation steps, until after a requested page table entry for the corresponding virtual address is retrieved. However, state machine 340 is responsive to a limited number of request signals, such as an external request signal, depending on the state of state machine 340. For example, on receipt of an external request signal EXTERNALSNOOP, state machine 340 goes from state PDEREAD via branch 513 to state MEMORYHOUSEKEEPING to service the external request signal. Thereafter, state machine 340 returns to state PDEREAD via branch 514 after completion of service of the external request signal. Signal DONEFORPDEREAD, on return to state PDEREAD causes state machine 340 to continue the interrupted service of the internal request signal.

State machine 340 takes branch 511 only if no other request signal is pending in addition to the translate request signal TABLEWALKREQUEST from instruction TLB 235. If some other request signal is pending, state machine 340 processes that request signal first as described above. State machine 340 cycles through the same sequence of states, in response to an active translate request signal from either instruction TLB 235 or data TLB 275. In state PDEREAD, state machine 340 accesses the requested page directory entry for example, word CPDE (FIG. 7) from a level-2 cache 110 if present, and for example, word MPDE from main memory 130 either if level-2 cache 110 is not present, or if the necessary page directory entry is not found in level-2 cache 110. Specifically, state machine 340 performs the access function in state PDEREAD as indicated by read access operation 512 by transitioning through a number of states, illustrated by read access state machine 610 in FIG. 6A and described more completely below.

On receipt of a valid page directory entry, for example as indicated by signal VALIDPDEDATA, state machine 340 automatically goes via branch 515 to state TRANSLATEHOUSEKEEPING. In state TRANSLATEHOUSEKEEPING, state machine 340 automatically checks to see if an access bit A in the retrieved page directory entry is set. If the access bit A is not set, state machine 340 automatically returns from state TRANSLATEHOUSEKEEPING to state PDEREAD via branch 516 to update the page directory entry as indicated by signal UPDATEPDE (LOCKBUS).

On return from state TRANSLATEHOUSEKEEPING, via branch 516, state machine 340 automatically accesses a page directory entry for example, one of words CPDE or MPDE after locking the respective bus e.g. level-2 bus 121 or system bus 122 (FIG. 3A) thereby to ensure integrity of the retrieved word. After a page directory entry is retrieved and while the respective bus is locked, state machine 340 automatically goes from state PDEREAD to state TRANS- LATEHOUSEKEEPING to write the page directory entry back with an updated access bit A and then releases the lock on system bus 122. This read-modify-write locked bus transaction is completely indivisible, i.e. uninterrupted by any control request signal. Then, state machine 340 automatically goes via branch 517 to state PTEREAD as indicated by signal PDEOK. Such automatic transition of state machine 340 from state PDEREAD to state TRANSLATEHOUSEKEEPING, and back to state PDEREAD, back to state TRANSLATEHOUSEKEEPING, then to state PTEREAD saves time by eliminating the need for state machine 340 to wait for a pull from other portions of processor 120. Moreover, in this embodiment, state machine 340 does not access the first level of cache formed by caches 230, 270 and therefore also saves time. As noted above, elimination of such a first level of cache access during address translation also eliminates pollution of caches 230, 270, and allows more useful words to be stored. Moreover, elimination of such a first level of cache access also reduces the need to make the first level of caches 230, 270 multi-ported.

Figure 6A:
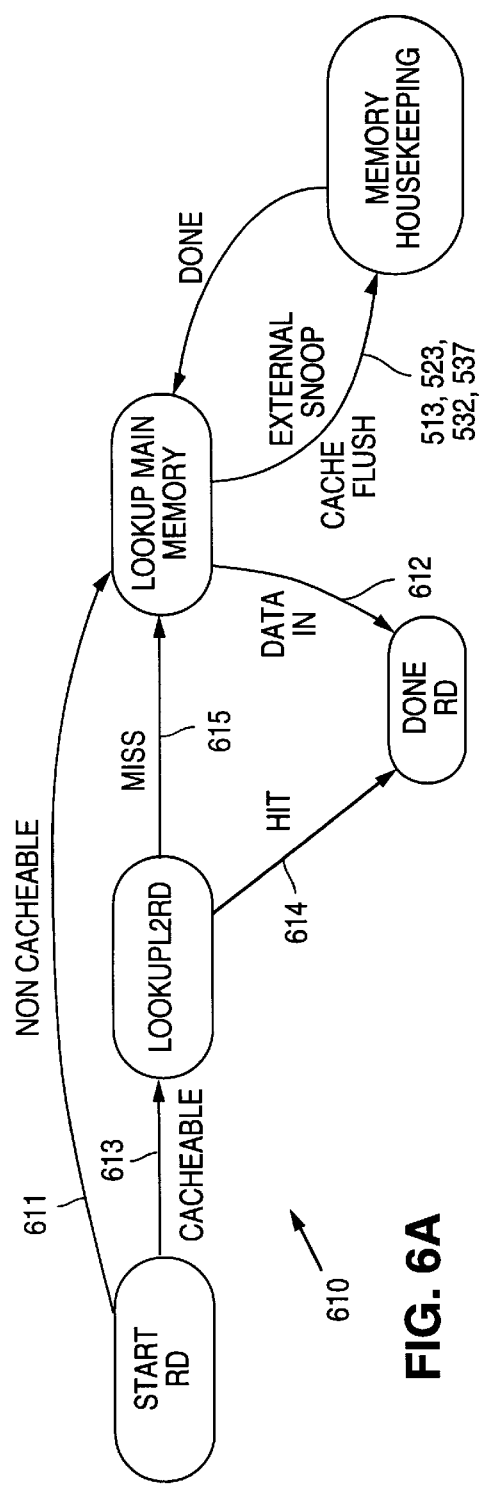
FIGS. 6A–6B illustrate read access and write access state machines included in the access translate state machine of FIG. 5 to perform read access operations in states MEMORYREAD, PDEREAD, PTEREAD and to perform a write access operation in state MEMORYWRITE.

In state PTEREAD, state machine 340 accesses the appropriate page table entry e.g. word CPTE or MPTE, by following a read access operation 518 also illustrated by read access state machine 610 of FIG. 6A (described below). On receipt of a valid page table entry word, state machine 340 automatically transitions from state PTEREAD to state TRANSLATEHOUSEKEEPING via branch 519. In state TRANSLATEHOUSEKEEPING, state machine 340 automatically checks if the access and dirty bits A and D of the retrieved page table entry are set, and if so, state machine 340 supplies the retrieved page table entry on data output terminals 419 (FIG. 4A) and drives a status signal ACKNOWLEDGEREQUESTOR on status output terminals 338 to thereby alert the component requesting the word, in this example, instruction TLB 235. Thereafter, state machine 340 transitions from state TRANSLATEHOUSEKEEPING to state IDLE via branch 520.

If an access bit A is not set for the retrieved page table entry, state machine 340 automatically goes from state TRANSLATEHOUSEKEEPING via branch 521 to state PTEREAD to perform a read-modify-write locked bus transaction of the type described above. Specifically, state machine 340 automatically locks system bus 122 and again retrieves the requested page table entry and thereafter, automatically transitions via branch 519 back to state TRANSLATEHOUSEKEEPING. In state TRANSLATEHOUSEKEEPING, while the bus is still locked, state machine 340 automatically writes the page table entry with the updated access bit and dirty bit into memory, then supplies the retrieved page table entry at the data output terminals 419 while driving the signal ACKNOWLEDGEREQUESTOR at status terminals 338 and transitions via branch 520 in the manner described above.

In addition to checking and setting the access bit A and the dirty bit D, in this embodiment, state machine 340 also checks that a user has the appropriate privilege for accessing a page containing the addressed word and identified by the page table entry. If the user does not have the required privilege, state machine 340 transitions via branch 520 to state IDLE while driving the signal ACCESSVIOLATION on status terminals 338.

Also, in state PTEREAD in response to an external request signal EXTERNALSNOOP from system bus 122, state machine 340 goes via branch 523 to state MEMORYHOUSEKEEPING if the page table entry is not found in level-2 cache 110. On completion of the functions servicing the snoop request, state machine 340 transitions back via branch 524 to state PTEREAD, and continues retrieval of the page table entry. State machine 340 also takes branch 523 if a line from level-2 cache 110 is to be written back to main memory 130, for example, if there is a miss in the level-2 cache for the required page table entry.

Therefore, the states PDEREAD, TRANSLATEHOUSEKEEPING and PTEREAD together with a state IDLE collectively constitute table walk states 502 included in table walk logic 320 (FIG. 3A). In addition to table walk states 502, state machine 340 also includes MEMORYHOUSEKEEPING, MEMORYREAD and MEMORYWRITE (FIG. 5), which together with state IDLE form second level access states 501 included in memory access logic 310 (FIG. 3A). Sharing of state IDLE (FIG. 5) by second level access states 501 and table walk states 502 eliminates the need to pass information back and forth between memory access logic 310 and table walk logic 320, for example, to arbitrate sharing of commonly used units, such as level-2 cache interface unit 410 and system interface unit 220.

In response to an access request signal MEMORYRDREQUEST, (FIG. 5), for example, from level-1 control logic 260 (FIG. 3A), access translate state machine 340 goes via branch 530 (FIG. 5), to state MEMORYREAD. In state MEMORY READ, state machine 340 performs a read access operation 529 illustrated by read access state machine 610 (FIG. 6A described below) to retrieve the requested data, supplies the requested data at data output terminals 419 while driving a status signal ACKNOWLEDGEREQUESTOR on status terminal 338 and transitions via branch 531 back to state IDLE.

On receipt of an external request signal EXTERNALSNOOP, state machine 340 goes from state MEMORYREAD to state MEMORYHOUSEKEEPING via branch 532. On completion of functions servicing the snoop request, state machine 340 goes via branch 533 back to state MEMORYREAD. State machine 340 also takes branches 532 and 533 in case a line from level-2 cache 110 needs to be written back to main memory 130, for example, in case the requested word is not found in the level 2 cache 110.

Figure 6B:
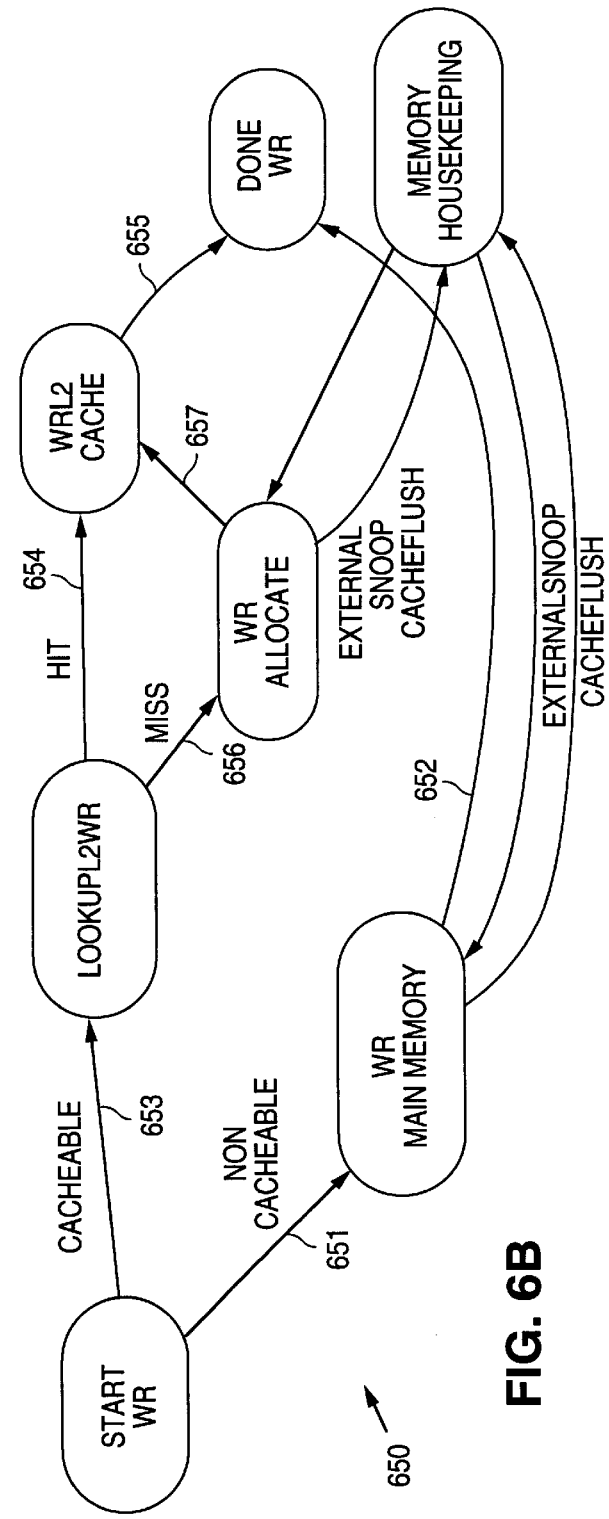

In response to an access request signal MEMORYWRREQUEST, for example, from level 1 control logic 260 and originating from data cache 270, state machine 340 goes from state IDLE via branch 534 to state MEMORYWRITE. In state MEMORYWRITE, state machine 340 performs a write access operation 535 as illustrated by write access state machine 650 (FIG. 6B; described below), and after completion of writing the word, drives a signal ACKNOWLEDGE REQUESTOR on status terminal 338 and returns back to state IDLE.

In response to an external request signal EXTERNALSNOOP, state machine 340 goes from state MEMORYWRITE to state MEMORYHOUSEKEEPING, via branch 537. On completion of functions servicing the snoop request, state machine 340 returns from state MEMORYHOUSEKEEPING back to state MEMORYWRITE via branch 538. State machine 340 also transitions via branches 537 and 538 if a line from level-2 cache 110 needs to be written back to main memory 130 for example, if a dirty line needs to be replaced.

State machine 340 is also responsive to the external request signal EXTERNALSNOOP in state IDLE, and goes via branch 540 to state MEMORYHOUSEKEEPING. On completion of service of the external request signal EXTERNALSNOOP, state machine 340 returns back to state IDLE via branch 541.

In any of the read access operations 512, 518 and 529, state machine 340 (e.g. read access state machine 610 in FIG. 6A) goes via branch 611 to state LOOKUPMAIN-MEMORY if the address to be looked up is noncacheable or if a signal on terminals 336 indicates absence of cache 110. If the address is cacheable, read access state machine 610 goes from state STARTRD via branch 613 to state LOOKUPL2RD. Read access state machine 610 then looks up level-2 cache 110 and on finding the requested word, goes via branch 614 to state DONERD, at which point read access state machine 610 is completed.

If there is a miss in the L2 cache 110, e.g. signal MISS on terminals 337, read access state machine 610 goes via branch 615 to state LOOKUPMAINMEMORY. In state LOOKUPMAINMEMORY, read access state machine 610 drives a signal active on terminals 335 to retrieve the requested word from main memory 130, performs a cache line fill operation for the requested word into level-2 cache 110 and thereafter transitions via branch 612 to state DONERD.

Read access state machine 610 is sensitive to an external request signal EXTERNALSNOOP as described above, but only in state LOOKUPMAINMEMORY from which state machine 340 (that includes read access state machine 610) may transition to state MEMORYHOUSEKEEPING (FIG. 5) via one of branches 513, 523, 532 and 537 (discussed above).

Write access state machine 650, when invoked, for example, by write access operation 535 (FIG. 5), goes from state MEMORYWRITE illustrated as state STARTWR (FIG. 6B) via branch 651 to state WRMAINMEMORY if a to-be-written word's address is non-cacheable. In state WRMAINMEMORY, write access state machine 650 writes the word (e.g. received at write data lines 413 in FIG. 4A) to main memory 130 (FIG. 1A). Then, write access state machine 650 goes via branch 652 (FIG. 6B) to state DONEWR, and thereafter state machine 340 transitions back to state IDLE via branch 536 (FIG. 5).

Write access state machine 650 goes from state STARTWR (FIG. 6B) via branch 653 to state LOOKUPL2WR if the address signal DC_WrAddr is cacheable. In state LOOKUPL2WR, write access state machine 650 looks up level-2 cache 110 to check if the word to be written should go into the level-2 cache. If so, write access state machine 650 goes via branch 654 to state WRL2CACHE. Then write access state machine 650 writes the word into level-2 cache 110 and then goes via branch 655 to state DONEWR.

If the address is not found in level-2 cache 110, write access state machine 650 goes via branch 656 to state WRALLOCATE. In state WRALLOCATE, write access state machine 650 fills the line in level-2 cache 110 with the line from main memory 130 corresponding to the write address and then goes via branch 657 to state WRL2 cache. In state WRALLOCATE, write access state machine 650 may, if necessary, flush a corresponding line to main memory 130 as necessary in accordance with the method for updating a direct mapped cache.

While performing the write sequence branch 650, write access state machine 650 is sensitive to an external request signal EXTERNALSNOOP as described above only in states WRMAINMEMORY and WRALLOCATE. From these two states, state machine 340 (that includes write access state machine 650) transitions to state MEMORY-HOUSEKEEPING (FIG. 5) and returns on completion of service of the external request signal.

Each of the states in state machine 340 requires operations that can themselves be state machines that are included in state machine 340. Examples of such operations include a read access operation 512 illustrated by read access state machine 610. Similarly, each of the states in an included state machine (e.g. read access state machine 610) can be further state machines of the type within ordinary skill in the art in view of the enclosed disclosure. For example, further state machines for states LOOKUPL2RD (FIG. 6A) and LOOKUPL2WR (FIG. 6B) are illustrated in the FIGS. 5A and 5B of the U.S. Pat. No. 5,761,736, entitled "APPARATUS AND METHOD FOR IMPLEMENTING MULTIPLE SCALED STATES IN A STATE MACHINE" by Puneet Sharma and John G. Favor, incorporated by reference above.

Depending on the respective speeds of processor 120, level-2 cache 110 and main memory 130, state machine 340 can spend different amounts of time in the states at any level of nesting, for example by use of scaled states as described in the above-referenced U.S. Pat. No. 5,761,736. The invention described herein includes, but is not limited to such implementation details of one particular implementation of state machine 340.

Figure 8A:
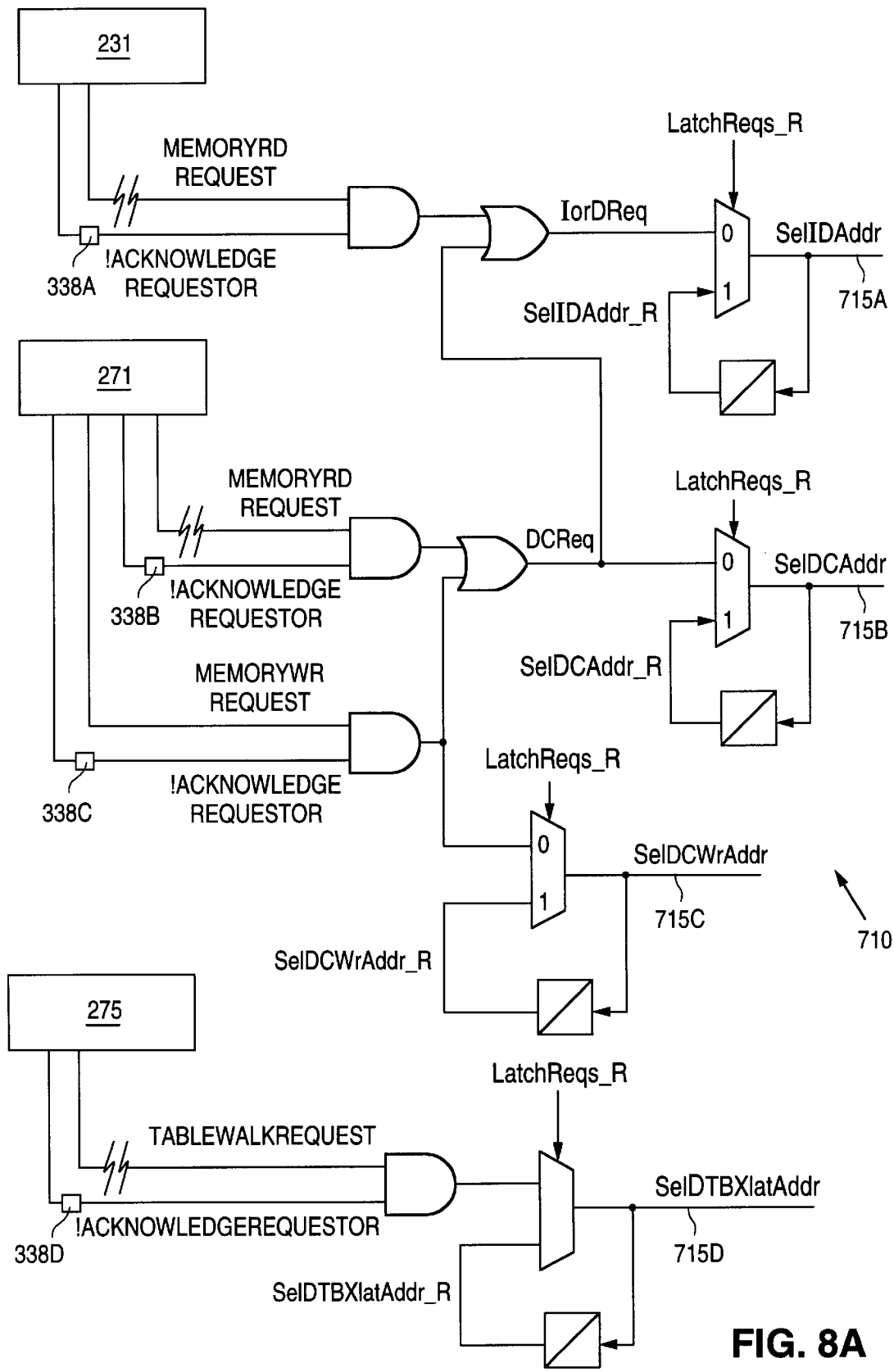
FIGS. 8A and 8B illustrate the address selector and address generator of FIG. 7.

In one specific embodiment of processor 120, address supply circuit 350 includes an address selector 710 (FIG. 7) that generates a number of selection signals for use in an address generator 720 also included in address supply circuit 350. Specifically, address selector 710 (FIG. 8A) drives a signal SelDCAddr active if either one of signals MEMORYRDREQUEST or MEMORYWRREQUEST from data cache 270 is active, for example on request control lines 351 (FIG. 7). Address selector 710 drives selection signal SelDCWrAddr active if signal MEMORYWRREQUEST from data cache 270 is active. Moreover, address selector 710 drives a selection signal SelIDAddr active if any one of access request signals MEMORYWRREQUEST or MEMORYRDREQUEST is active. Finally, address selector 710 also drives a selection signal SelDTBXlatAddr active if translate request signal TABLEWALKREQUEST from data TLB 275 is active.

Figure 8B:
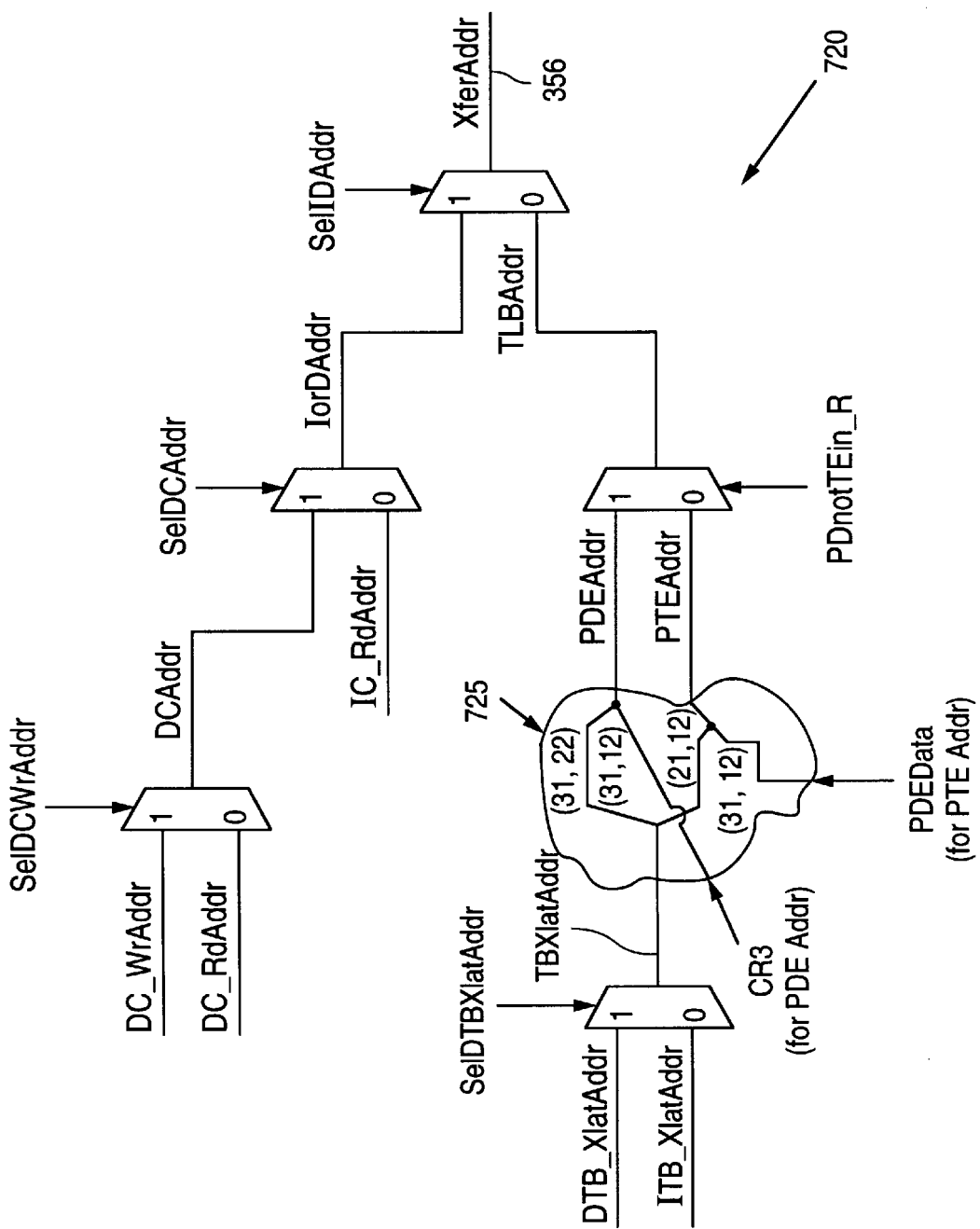

In response to these selection signals from address selector 710, address generator 720 (FIG. 8B) passes physical address signal DC_WrAddr from data cache 270 if present, as indicated by signal SelDCWrAddr, onto the physical address lines 356 as signal XferAddr. Otherwise, if signal SelDCAddr is active, address generator 720 (FIG. 8B) passes the physical address signal DC_RdAddr from data cache 270 onto the physical address lines 356. Otherwise, address generator 720 supplies the physical address signal IC_RdAddr from instruction cache 230 if present on address input lines 352 as indicated by signal SelIDAddr, onto the physical address lines 356.

Otherwise, address generator 720 generates a physical address TBXlatAddr from one of the two translate address signals DTB_XlatAddr and ITB_XlatAddr respectively from data TLB 275 and instruction TLB 235, as indicated by selection signal SelDTBXlatAddr. Specifically, address generator 720 implements in address logic 725 (FIG. 8B) the following formula, where signal TBXlatAddr is one of the two translate address signals:

PDEAddr[31:2]={CR3[31:12], TBXlatAddr[31:22]}

PTEAddr[31:2]={PDEAddr[31:12], TBXlatAddr[21:12]}

Although certain preferred embodiments have been described herein, the invention is not limited thereto. For example, the second level control unit can use a retrieved page table entry to form a physical address and also use the physical address to retrieve the necessary word from main memory, and update the first level cache.

Moreover, the second level access logic 310 can be loosely coupled (rather than tightly coupled) to table walk logic 320, and be located on an integrated circuit, e.g. memory controller 180, different from the integrated circuit that contains table walk logic 320.

In other embodiments, the table walk logic and the second level access logic can be loosely coupled to each other, e.g., with the second level access logic being implemented on an integrated circuit chip different from the table walk logic's chip.

Furthermore, although in one embodiment, state machine 340 has been described as returning to state IDLE, for example from state MEMORYREAD or from state MEMORYWRITE, in other embodiments, such transition to state IDLE can be eliminated. For example, in one embodiment, state machine 340 processes any pending access request signal at the end of processing the current request signal MEMORYRDREQUEST in state MEMORYREAD. State machine 340 also transitions from state MEMORYREAD to state MEMORYWRITE if access request signal MEMORYWRREQUEST is pending on completion of service of the current request signal MEMORYRDREQUEST, even if another access request signal MEMORYRDREQUEST is pending. In this particular embodiment, state machine 340 does not transition from one of access states MEMORYREAD and MEMORYWRITE directly to translate state PDEREAD (or visa-versa) but rather goes through state IDLE.

Numerous modifications and adaptations of the described embodiments are apparent to a person of skill in the art in view of the enclosed disclosure. Various such modifications and adaptations are covered by the attached claims.

We claim:

1. In a computer system having a processor capable of executing instructions using a plurality of virtual addresses, and memory addressable by a plurality of physical addresses, said memory being capable of storing a plurality of words and a plurality of table entries used in translation of a virtual address to a physical address, said memory including at least a first level cache and a main memory, a second level control unit having a plurality of control request terminals, a plurality of address input terminals, a plurality of table entry terminals, and a plurality of physical address terminals, wherein said second level control unit operates in one of at least two modes:

said second level control unit operates in an access mode in response to a first signal on said control request terminals, and passes a first address received at said address input terminals on to said physical address terminals;

said second level control unit operates in a translate mode in response to a second signal on said control request terminals, and passes a second address derived from a first portion of a virtual address received at said plurality of address input terminals onto said physical address terminals further wherein said second level control unit is responsive to each of said first signal and said second signal when pending or received simultaneously on said control request terminals.

2. The second level control unit of claim 1, during an operation in said translate mode, said second level control unit continues to perform said operation in said translate mode irrespective of signals received at said control request terminals.

3. The second level control unit of claim 1, operates in said access mode prior to operation in said translate mode when said first and second signals are pending or received simultaneously on said control request terminals.

4. The second level control unit of claim 1, wherein said virtual address is received at said address input terminals and said second level control unit forms said second address by combining said first portion of said virtual address with a table base address from a register in said computer system.

5. The second level control unit of claim 1, wherein a high order portion of said virtual address is received at said address input terminals, and said second level control unit forms said second address by combining a predetermined number of high order bits of said high order portion with a table base address from a register in said computer system.

6. The second level control unit of claim 1, comprising:

a single state machine having a plurality of system control lines and a latch request line; and an address supply circuit having a plurality of address input lines coupled to said address input terminals, a plurality of control request lines coupled to said control request terminals, a plurality of table entry lines coupled to said table entry terminals, a latch request terminal coupled to said latch request line and a plurality of physical address lines coupled to said physical address terminals;

wherein said state machine drives a signal active on said latch request line if a signal is active on any of said system control lines of said state machine; and further wherein said address supply circuit latches an address from said address input terminals in response to an active signal on said latch request terminal.

7. The second level control unit of claim 6, wherein said address supply circuit passes said address on said physical address lines, in response to an active signal on a first control request line of said address supply circuit.

8. The second level control unit of claim 6, wherein said address supply circuit has a plurality of table base address terminals, and further wherein said address supply circuit combines a signal from said table base address terminals and a predetermined number of high order bits of said address to form said second address and supplies said second address on said physical address lines; and further wherein said address supply circuit combines a second predetermined number of high order bits of a signal received on said table base address terminals with a signal received on said table entry terminals to form a third address, and supplies said third address on said physical address lines in response to an active signal from said state machine.

9. The second level control unit of claim 6, wherein said address supply circuit responds to an active signal on said first control request terminal prior to response to an active signal on said second control request terminal, and wherein said first and second control request terminals both have active signals on receipt of said active signal on said latch request terminal.

10. The second level control unit of claim 1 wherein:

said plurality of address input terminals include a first group of address input terminals for receipt of said first address and said plurality of control request terminals and said plurality of address input terminals include a second group of address input terminals for receipt of a third address; and said second level control unit operates in said access mode in response to a third signal on said control request terminals and passes said third address received at said second group of address input terminals on to said physical address terminals.

11. The second level control unit of claim 10 wherein:

said control unit prioritizes by passing said first address prior to passing said third address when said first signal and said third signal are both pending or received simultaneously on said control request terminals.

12. The second level control unit of claim 1 wherein:

said second level control unit operates sequentially in each of the modes by first operating in one of the two modes, and only after completion of said first operating operates in the other of the two modes when said first signal and said second signal are pending or received simultaneously on said control request terminals.

13. In a computer system having a processor capable of executing instructions using a plurality of virtual addresses, and memory addressable by a plurality of physical addresses, said memory being capable of storing a plurality of words and a plurality of table entries used in translation of a virtual address to a physical address, said memory comprising at least a first level cache and a main memory, a second level cache controller comprising:

a second level cache interface unit having a plurality of cache address lines, a plurality of cache bus terminals, at least one control input line, a plurality of cache output lines; and a second level control unit having a plurality of control request terminals, a plurality of address input terminals, a plurality of table entry terminals and a plurality of physical address terminals, at least one cache control terminal and at least one cache status terminal;

wherein said cache control terminal is coupled to said control input line, said cache status terminal is coupled to cache output lines, said table entry terminals are coupled to the rest of said cache output lines, and said physical address terminals are coupled to said cache address lines;

further wherein said second level control unit operates in one of at least two modes:

said second level control unit operates in an access mode in response to an active signal on a first control request terminal, and passes a physical address received at said address input terminals on to said physical address terminals; and said second level control unit operates in a translate mode in response to an active signal on a second control request terminal, passes a first table entry address derived from a first portion of a virtual address onto said physical address terminals, combines said first table entry with a second portion of said virtual address to form a second table entry address after receipt of said first table entry at said table entry terminals, and passes said second table entry address to said physical address terminals.

14. The second level cache controller of claim 13, wherein said second level cache interface unit passes a word on to said cache output lines and drives a hit signal active on said cache status terminal in response to receipt of said word at said cache bus terminals.

15. The second level cache controller of claim 13, wherein said second level cache interface unit supplies said physical address on said cache bus terminals on receipt of said physical address at said cache address lines, when a signal indicative of the existence of a second level cache is active on said cache control terminal.

16. The second level cache controller of claim 13, wherein said second level control unit has a plurality of system control terminals, and drives a signal active on a system control terminal in response to an active read miss signal on said cache status terminal.

17. The second level cache controller of claim 13, wherein said second level control unit operates in said access mode prior to operation in said translate mode when active signals are pending or received simultaneously on each of said first and second control request terminals.

18. The second level cache controller of claim 13 further comprising:

a single state machine having a plurality of system control lines and a latch request line; and an address supply circuit having a plurality of address input lines coupled to said address input terminals, a plurality of control request lines coupled to said control request terminals, a plurality of table entry lines coupled to said table entry terminals, a latch request terminal coupled to said latch request line and a plurality of physical address lines coupled to said physical address terminals;

wherein said state machine drives a signal active on said latch request line if a signal is active on any of said system control lines of said state machine; and further wherein said address supply circuit latches an address from said address input terminals in response to an active signal on said latch request terminal.

19. The second level cache controller of claim 18, wherein said address supply circuit passes said address on said physical address lines, in response to an active signal on a first control request line of said address supply circuit.

20. The second level cache controller of claim 18, wherein said address supply circuit has a plurality of table base address terminals, and further wherein said address supply circuit combines a signal from said table base address terminals and a predetermined number of high order bits of said address to said second address and supplies said second address on said physical address lines; and further wherein said address supply circuit combines a second predetermined number of high order bits of a signal received on said table base address terminals with a signal received on said table entry terminals to form a third address, and supplies said third address on said physical address lines in response to an active signal from said state machine.

21. The second level cache controller of claim 18, wherein said address supply circuit responds to an active signal on said first control request terminal prior to response to an active signal on said second control request terminal, in said first and second control request terminals both have active signals on receipt of said active signal on said latch request terminal.

22. A control unit for use in a computer system having a processor capable of executing instructions using a plurality of virtual addresses, and memory addressable by a plurality of physical addresses, said memory being capable of storing a plurality of words and a plurality of table entries used in translation of a virtual address to a physical address, said memory including at least a previous-level cache and a main memory, the computer system including a previous-level cache control logic, and a translation lookaside buffer containing entries to be used in translation of a virtual address to a physical address;

said control unit having a plurality of control request terminals coupled, in use, to receive signals from said previous-level cache control logic and the translation lookaside buffer, a plurality of address input terminals for receiving from said translation lookaside buffer a signal to be used in addressing said memory, a plurality of table entry terminals, and a plurality of physical address terminals, wherein said control unit operates in one of at least two modes:

said control unit operates in an access mode in response to a first signal from the first level cache control logic indicating the provision of a physical address by the translation lookaside buffer on said control request terminals, and passes a first address received at said address input terminals on to said physical address terminals;

said control unit operates in a translate mode in response to a second signal on said control request terminals, said second signal being from the translation lookaside buffer indicating a miss has occurred, and passes a second address derived from a first portion of a virtual address received at said plurality of address input terminals onto said physical address terminals.

23. The control unit of claim 22 wherein the control unit:

automatically combines a first table entry with a second portion of said virtual address to form a second table entry address on receipt of said first table entry at said table entry terminals, and automatically passes said second table entry address to said physical address terminals.

24. The control unit of claim 22, comprising:

a single state machine having a plurality of system control lines and a latch request line; and an address supply circuit having a plurality of address input lines coupled to said address input terminals, a plurality of control request lines coupled to said control request terminals, a plurality of table entry lines coupled to said table entry terminals, a latch request terminal coupled to said latch request line and a plurality of physical address lines coupled to said physical address terminals;

wherein said state machine drives a signal active on said latch request line if a signal is active on any of said system control lines of said state machine; and further wherein said address supply circuit latches an address from said address input terminals in response to an active signal on said latch request terminal.

25. An integrated circuit for use in a computer system having a processor capable of executing instructions using a plurality of virtual addresses, and memory addressable by a plurality of physical addresses, said memory being capable of storing a plurality of words and a plurality of table entries used in translation of a virtual address to a physical address, said memory comprising at least a previous-level cache and a main memory, the computer system including previous-level cache control logic, and a translation lookaside buffer containing entries needed for translation of a virtual address to a physical address, the integrated circuit further including a cache controller comprising:

a cache interface unit having a plurality of cache address lines, a plurality of cache bus terminals, at least one cache control line, a plurality of cache output lines; and a control unit having a plurality of control request terminals connected, in use, to receive signals from first level cache control logic and the translation lookaside buffer, a plurality of address input terminals for receiving from said translation lookaside buffer a signal to be used in addressing said memory, a plurality of table entry terminals and a plurality of physical address terminals, at least one cache control terminal and at least one status terminal;

wherein said cache control terminal is coupled to said cache control line, said cache status terminal is coupled to cache output lines, said table entry terminals are coupled to the rest of said cache output lines, and said physical address terminals are coupled to said cache address lines;

further wherein said control unit operates in one of at least two modes:

said control unit operates in an access mode in response to an active signal from the first level cache control logic on a first control request terminal indicating the provision of a physical address by the translation lookaside buffer, and passes said physical address received at said address input terminals on to said physical address terminals; and said control unit operates in a translate mode in response to an active signal from the translation lookaside buffer indicating that a miss has occurred on a second control request terminal, passes a first table entry address derived from a first portion of a virtual address onto said physical address terminals, combines said first table entry with a second portion of said virtual address to form a second table entry address after receipt of said first table entry at said table entry terminals, and passes said second table entry address to said physical address terminals.

26. The integrated circuit of claim 25, wherein said cache interface unit supplies said physical address on said cache bus terminals on receipt of said physical address at said cache address terminals, when a signal indicative of the existence of a cache is active on said cache control terminal.

* * * * *

UNITED STATES PATENT AND TRADEMARK OFFICE
CERTIFICATE OF CORRECTION

PATENT NO.    : 5,960,463
DATED         : September 28, 1999
INVENTOR(S)   : Sharma, Puneet and Favor, John G.

It is certified that error appears in the above-identified patent and that said Letters Patent is hereby corrected as shown below:

Column 1,
Line 8 delete "copending";
Lines 9-10 delete "patent application serial no. 08/649,243" and insert -- 5,884,059 --;
Line 16 delete "copending"; and Column 11,
Line 11 delete "pull" and insert -- poll --.

Signed and Sealed this

Seventh Day of May, 2002

Attest:

Attesting Officer

JAMES E. ROGAN
Director of the United States Patent and Trademark Office